UNITED STATES PATENT OFFICE.

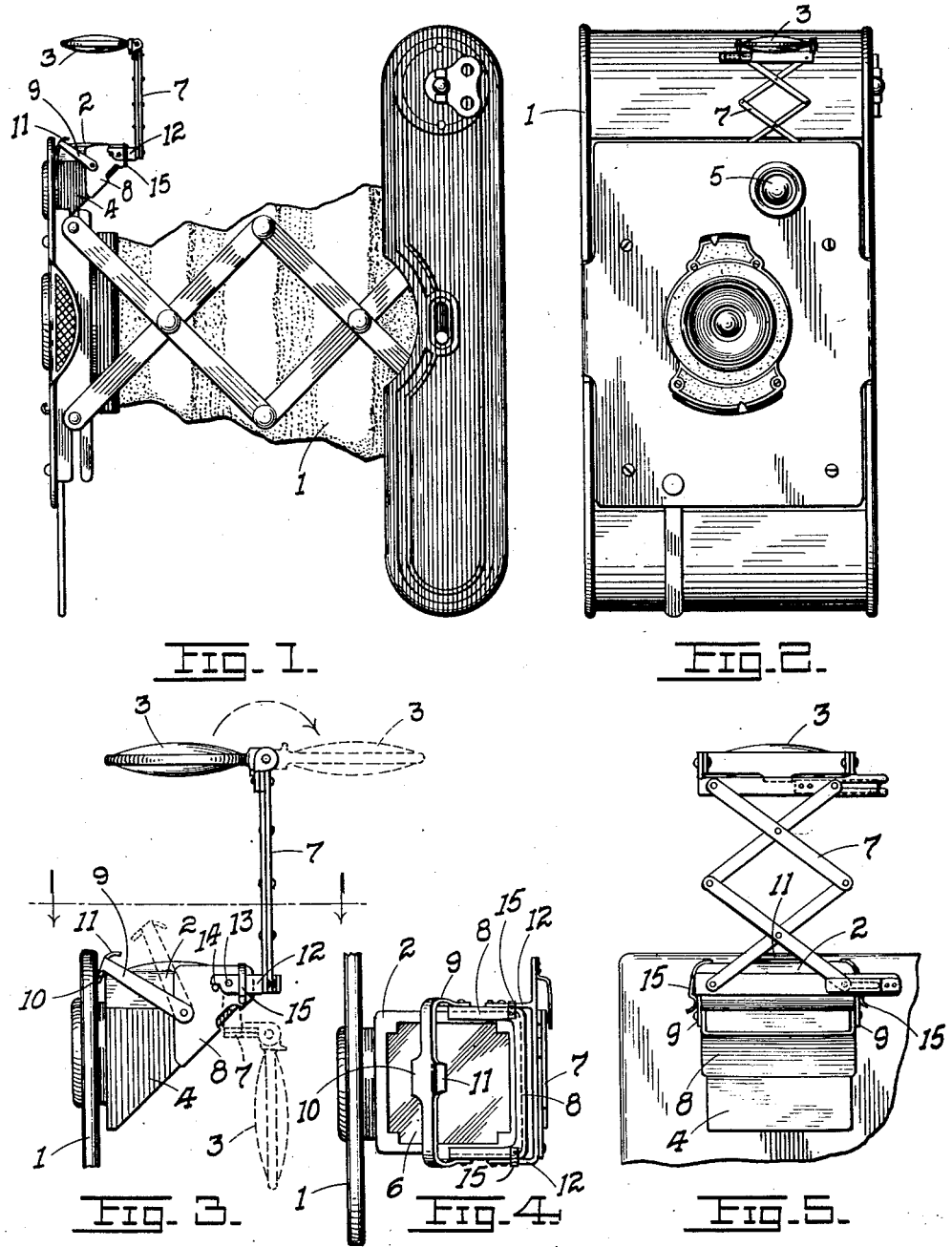

EZRA B. SMITH, OF CHICAGO, ILLINOIS.

AMPLIFYING-FINDER FOR CAMERAS.

1,167,319.  Specification of Letters Patent.  Patented Jan. 4, 1916.

Application filed August 8, 1914. Serial No. 855,752.

*To all whom it may concern:*

Be it known that I, EZRA B. SMITH, a citizen of the United States, residing at Chicago, county of Cook, and State of Illinois, have invented a certain new and useful Improvement in Amplifying-Finders for Cameras, and declare the following to be a full, clear and exact description of the same, such as will enable others skilled in the art to which it pertains to make and use the same, reference being had to the accompanying drawings, which form a part of this specification.

My invention relates to the art of photography and has for its object to facilitate the taking of and to improve the quality of pictures taken with cameras of the type having finders in which the field is disclosed.

The image of the field to be photographed is so small in the customary finder compared with the image focused on the photographic plate or film that in many cases the finder is almost useless and often leads to disappointing results. Thus; it is often difficult to determine from the finder just what will be included in the picture, even where there is ample time for carefully studying the image in the finder; and, where instantaneous action is required, as where a rapidly passing object is to be photographed, the smallness of the image may make it impossible to see the detail with sufficient distinctness to insure the desired results. Again, in taking portraits, it is difficult to determine from the finder just what the expression of the subject's face is and the photograph often discloses an entirely different expression than that apparently seen in the finder. Viewed in another aspect, it is practically impossible to see the expression of the subject's face clearly and distinctly in the finder and therefore the desired expression may come and go before the person taking the photograph realizes it and makes the exposure. Furthermore, if a person's eyes are weak or otherwise defective, the finder is of little value to him in taking the picture.

I attain the object of my invention by a simple expedient which gives a much larger and clearer image than is seen in the ordinary finder, thus bringing out the detail of the entire field sharply and clearly enough to make it possible for the user to see instantly exactly how a photograph would or will look; thus making it possible for the user always to see exactly what is in the field and to know just the right instant for photographing a moving object or for making the exposure for a portrait so as to catch the desired expression on the subject's face.

The various features of novelty whereby my invention is characterized will hereinafter be pointed out with particularity in the claims; but, for a full understanding of my invention and of its object and advantages, reference may be had to the following detailed description taken in connection with the accompanying drawing, wherein:

Figure 1 is a side elevation of a telescoping kodak equipped in accordance with my invention; Fig. 2 is a front view; Fig. 3 is a side view on a larger scale of the improved finder; Fig. 4 is a section on line 4—4 of Fig. 3; and Fig. 5 is a rear view of the improved finder.

Reference being had to the drawing, 1 represents a camera of any usual or suitable construction, having a finder, 2, of any desired type. In accordance with my invention I provide a lens, 3, which is or may be placed in such relation to the finder that the image in the latter is greatly enlarged and amplified thereby. Thus the image, which would ordinarily be small and indistinct and give rise to the difficulties heretofore enumerated, becomes large and clear and makes it easy to take just the picture desired, even under adverse condition as to time, place or subject. The lens, 3, is of course made adjustable so as to adapt it to the many different kinds of eyes to be found among the users. It may also be made detachable, or in the form of an attachment to an existing finder.

In the arrangement illustrated, the finder comprises a small triangular casing or housing, 4, having in the front wall a lens, 5, and in the top a lens, 6, through which the image is seen. The lens, 3, is hinged upon the upper end of a lazy-tongs device, 7, which is carried by a cap, 8, which is adapted to be slipped upon the upper rear corner of the casing or housing of the finder. A spring bail or yoke, 9, carried by the cap, 8, is adapted to be sprung down over the upper front corner of the casing or housing, 4, to draw the cap firmly into place. The bail may have bowed arms, as illustrated, to give it resiliency in the proper direction, and it may have a nose, 10, adapted to pass over the front corner of the member, 4, together with an ear, 11, by which it may be grasped to lift the bail out of locking position.

Instead of mounting the lazy-tongs device directly upon the cap, 8, it may be secured at its lower end to a bail, 12, embracing the cap from the rear and hinged thereto as at, 13. A pin or pins, 14, limits the swinging movements of the bail, 12, in the upward direction and serves to arrest the bail when the lazy-tongs device is in the position to bring the lens, 3, directly over the lens, 6, in the finder. A spring clip, 15, or the cap serves as a catch for yieldably holding the bail, 12, against the pin or pins, 14.

When the camera is not in use the lazy-tongs is collapsed and the bail, 12, is swung down into the position indicated in dotted lines in Fig. 3, allowing the lens, 3, to hang behind the finder and out of the way when the camera is to be closed.

While I have illustrated and described with particularity only a single form of my invention, one adapted to be attached to an old type of finder, I do not desire to be limited to the structural details so illustrated and described or to a device which is simply an attachment which may be removed; but intend to cover all forms and arrangements which come within the terms of the definition of my invention constituting the appended claims.

I claim:

1. The combination with a folding camera, of a universally focused finder adapted to be housed in the camera when the latter is folded, of an attachment for focusing and enlarging the image produced by the finder; said attachment including a lens, and a collapsible and extensible member for supporting the lens in an extended working position above the finder and also in an idle position in such proximity to the finder as to permit it to be housed within the camera when the latter is folded.

2. The combination with a folding camera, of a finder adapted to be housed in the camera when the latter is folded, and an attachment for focusing and enlarging the image produced by the finder; said attachment including a member adapted to be detachably connected to the finder, lens, and a collapsible and extensible support arranged between said lens and said member and constructed and arranged to support the lens in a working position above the finder and also in an idle position in such proximity to the finder as to permit the attachment to be housed within the camera when the latter is folded.

3. The combination with a folding camera, of a finder adapted to be housed in the camera when the latter is folded, of a collapsible and extensible support connected at one end to the finder, and a lens connected to the other end of the support, the parts being so constructed and arranged that the support may be extended to support the lens in a view position and be collapsed to bring the lens in such proximity to the finder as to permit it to be housed in the camera when the latter is folded.

4. The combination with a folding camera having a lens adapted to be housed in the camera when the latter is folded, of a collapsible and extensible support connected at one end to the finder at one edge of the latter, and a lens hinged to the other end of said support so as to be capable of swinging about an axis parallel with said edge from a view position above the finder to an idle position in such proximity to the finder as to permit it to be housed within the camera when the latter is folded.

5. The combination with the non-focusing finder of a folding camera adapted to be folded into the camera, of a lens, and an extensible and collapsible support for the lens mounted on the finder, said support being constructed and arranged to permit the lens to be moved transversely of the direction of the folding movement of the camera when the camera is open and to position the lens in such proximity to the finder when it is desired to close the camera to permit the camera to be folded.

6. The combination with the non-focusing finder of a folding camera, of a lens, and a collapsible and extensible support for said lens, and means for movably securing said support to the finder so as to permit the support to be swung into position to bring the lens beside the finder and also into a position in which the lens lies above the finder, the parts being so constructed and arranged that when the support is collapsed and swung into the position in which the lens lies beside the finder the camera may be closed.

7. The combination with the non-focusing finder of a folding camera adapted to be folded into the camera, of a lens and a collapsible support for the lens mounted on the finder, said support being constructed and arranged to permit the lens to be moved transversely of the folding movement of the camera when the camera is open and to position the lens in such proximity to the finder when it is desired to close the camera to permit the camera to be folded.

In testimony whereof, I sign this specification in the presence of two witnesses.

EZRA B. SMITH.

Witnesses:
  A. POTASCH,
  WM. F. FREUDENREICH.